US009386654B2

(12) United States Patent
McDermott et al.

(10) Patent No.: US 9,386,654 B2
(45) Date of Patent: Jul. 5, 2016

(54) CONTROLLED FUNCTION LIGHT EMITTING DIODE LIGHTING DEVICE AND METHOD

(71) Applicant: Kevin McDermott, Rockledge, FL (US)

(72) Inventors: Damien McDermott, Viera, FL (US); Chris Raisch, Mims, FL (US); Kevin McDermott, Rockledge, FL (US)

(73) Assignee: Damien McDermott, Viera, FL (US)

( * ) Notice: Subject to any disclaimer, the term of this patent is extended or adjusted under 35 U.S.C. 154(b) by 0 days.

(21) Appl. No.: 14/717,617

(22) Filed: May 20, 2015

(65) Prior Publication Data

US 2015/0257221 A1 Sep. 10, 2015

Related U.S. Application Data

(63) Continuation-in-part of application No. 13/906,958, filed on May 31, 2013.

(51) Int. Cl.
*G05F 1/00* (2006.01)
*H05B 37/02* (2006.01)
*H05B 33/08* (2006.01)

(52) U.S. Cl.
CPC ........ *H05B 33/0866* (2013.01); *H05B 33/0812* (2013.01); *H05B 33/089* (2013.01); *H05B 33/0854* (2013.01)

(58) Field of Classification Search
CPC .... H05B 37/02; H05B 33/08; H05B 33/0845; G05F 1/00; B60Q 1/50
USPC ......... 315/224, 307, 308, 309, 149, 312, 291, 315/118, 297
See application file for complete search history.

(56) References Cited

U.S. PATENT DOCUMENTS

| 6,441,558 | B1 * | 8/2002 | Muthu | ............... H05B 33/0863 315/118 |
| 7,319,298 | B2 * | 1/2008 | Jungwirth | ............ H05B 33/086 250/216 |
| 7,712,925 | B2 | 5/2010 | Russell | |
| 7,812,553 | B2 * | 10/2010 | Kang | ................. H05B 33/0818 315/224 |
| 2006/0022616 | A1 * | 2/2006 | Furukawa | ......... G02F 1/133603 315/309 |
| 2008/0029084 | A1 | 2/2008 | Santo | |
| 2008/0219001 | A1 | 9/2008 | Russell | |
| 2012/0146548 | A1 | 6/2012 | Campbell | |

OTHER PUBLICATIONS

Shibata, Masanobu; "Internal Resistance of an LED as a function of Temperature," ISB Journal of Physics, Jan. 2010. <URL: http://www.isb.ac.th/hs/jop/vol4iss1/Papers/1 LEDTemp.pdf> pp. 1-4.
International Search Report for corresponding PCT International Application No. PCT/US2014/039983, dated Oct. 16, 2014.
Tilly, John et al., "Wide Input Range 1A LED Driver Powers High Brightness LEDs with Automotive and 12VAC Supplies," Linear Technology, Design Notes.

\* cited by examiner

*Primary Examiner* — Daniel D Chang
(74) *Attorney, Agent, or Firm* — Hauptman Ham, LLP

(57) ABSTRACT

A lighting device includes an electrical circuit for energizing an LED light source. The electrical circuit is configured to: have a target relationship between two illuminating operational parameters of the LED, connect the LED to a power source, energize the LED with a voltage waveform to effect a current waveform, determine a magnitude of each of the two operational parameters, determine an operational relationship between the two operational parameters, compare the target relationship with the operational relationship, determine a difference between the target relationship and the operational relationship and respond to the difference by adjusting the voltage waveform such that it changes one or both operational parameters to bring the operational relationship towards the target relationship.

22 Claims, 6 Drawing Sheets

| Programing a circuit having a memory with a target relationship between a first illuminating operational parameter and a second illuminating operational parameter. |

101

| Energizing an LED light source with a voltage waveform by the circuit and determining the first operational parameter, the second operational parameter, the operational relationship between the first operational parameter and the second operational parameter and a detemination of a nonconformance between the operational relationship and the target relationship. |

102

| Effecting a change in the voltage waveform in response to the nonconformance for bringing the operational relationship towards conformance with the target relationship. |

Programing a circuit having a memory with a target relationship between an illuminating voltage and an illuminating current.

201

Energizing an LED light source with a voltage waveform for the LED light source having a current waveform.

202

Maintaining an operational relationship between the illuminating voltage and the illuminating current in conformance with the target relationship for maintaining the junction temperature of the LED light source at a predetermined value.

203

CONTROLLED FUNCTION LIGHT EMITTING DIODE LIGHTING DEVICE AND METHOD

CROSS-REFERENCE TO RELATED APPLICATIONS

The present application is a continuation-in-part of U.S. patent application Ser. No. 13/906,958, filed on May 31, 2013, which is entirely incorporated by reference herein.

BACKGROUND

LED lighting devices are known for their high efficiency and longevity. However LED lamps are complex solid-state devices which can easily be damaged when operated outside of their permissible limits. In addition there is no known existing system for economically and accurately controlling performance characteristics or parameters of the LED light source including longevity, intensity and color.

One problem occurs because LEDs change resistance as the temperature of their PN junction changes. The variable resistance of the LED junction makes prevention of overheating or damage to the LED difficult. The variable resistance of the LED junction makes operation of the LED at a constant intensity, color, longevity or efficiency difficult.

Also, LEDs are prone to damage if the power delivered by the source of electrical power exceeds the respective power limitation for the LED. Adding to the complexity of LEDs is the fact that a maximum power limitation for the LED is not always a fixed value. The maximum power limitation can change with a number of parameters including ambient temperature, thermal circuit resistance, etc.

LED lamps are typically mounted on a circuit board and within a fixture. The resulting assembly provides a thermal path (thermal circuit) for the heat to be removed from the PN junction. If the thermal circuit is inadequate in that the thermal circuit is incapable of removing the necessary amount of heat from the PN junction—or if the thermal circuit changes such that the thermal circuit becomes inadequate, the PN junction can overheat and be damaged. As a consequence, circuits that are economical and commercial and effectively protect the PN junction require an excessively large safety factor.

A first design adjusts the magnitude of a constant current circuit to counter increases in the ambient temperature to prevent damaging the LED. This design adds a thermally sensitive resistor (thermistor) to the circuit to interact with the current control device. An example of this design can be found in Linear Technology Corp design note 388, FIG. 6, in which auxiliary components are added to a constant current control circuit LT 3474. The thermally sensitive resistor is typically mounted on the printed circuit board close to the LED and, upon an increase in ambient temperature, sends a signal to the current control device to change the value of constant current to a new value which is appropriate for the existing ambient temperature. This system is an improvement over the basic constant current circuit as it does initiate actions to protect the LED from overheating. However, the system is limited in that there is a time lag-due to the separation between the PN junction of the LED and the thermistor—before the thermally sensitive resistor sends a signal to the current control device. In addition, the thermally sensitive resistor is not positioned precisely at the PN junction. Therefore, the system does not experience the same temperature change as the PN junction. Hence, the thermally sensitive resistor's signal to the current control device does not fully address the ambient temperature problem.

Another design for an LED control utilizing dynamic resistance of LEDs utilizes the dynamic resistance of an array of LEDs to maintain the current through the LEDs at a desired level. This dynamic resistance design is similar to the constant current circuit in which an internal current sensing resistor of a constant current microchip circuit in a series arrangement with an LED array responds to a change in its current (also the current supplied to the LED array) by creating a signal. The signal adjusts the current flowing into the load or LED array to counter the changing current and return the sensed value of the current to the constant current level. Therefore, the dynamic resistance design does not prevent the LED from being damaged by overheating due to increases in the ambient temperature. The dynamic resistance design is limited in that the design requires an array of LED lamps with a dynamic resistance matched to the current control circuit. Finally, the dynamic resistance design does not maintain the performance parameters such as intensity, color, longevity etc. at target levels throughout changes in uncontrolled ambient conditions.

Thus, a need exists for effectively protecting the LED from damage and for the ability to maintain constant performance parameters such as intensity, color, longevity etc. of the emitted light.

BRIEF DESCRIPTION OF THE DRAWINGS

One or more embodiments are illustrated by way of example, and not by limitation, in the Figs of the accompanying drawings, wherein elements having the same reference numeral designations represent like elements throughout.

FIG. 6 illustrates a flow-chart of a method of bringing an operational relationship between a first illuminating operational parameter and a second illuminating operational parameter towards a target relationship.

FIG. 7 illustrates a flow-chart of a method of maintaining an operational relationship between an illuminating voltage and an illuminating current in conformance with a target relationship.

DETAILED DESCRIPTION OF THE DRAWINGS

Figure 1:
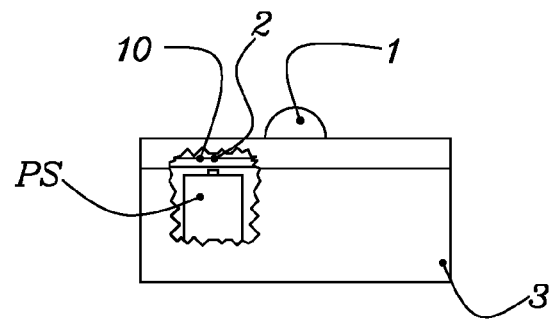
FIG. 1 is a front view of lighting device 20 according to some embodiments.

The present disclosure comprises a lighting device having a circuit which energizes an LED light source and determines the magnitudes of a plurality of electrical operational parameters such as illuminating voltages and illuminating currents. The circuit includes a target relationship between at least two selected electrical operational parameters and a means to maintain the target relationship between the selected operational parameters throughout uncontrollable changes about the device such as changes in the ambient temperature.

According to some embodiments, in maintaining the operational relationship at the target relationship, the circuit controls performance parameters such as longevity, color and intensity. The present application discloses that an operational relationship exists between two electrical illuminating parameters and, if that operational relationship is maintained at a target relationship, a third operational parameter can be held constant at a specified magnitude. Typical of the electrical illuminating parameters are illuminating voltage and illuminating current. Typical of the third operational parameter is the junction temperature.

The term energizing waveform within this application describes the waveform of voltage versus time which is applied by the circuit to the LED light source. A common energizing waveform is a constant voltage versus time waveform. Alternate energizing waveforms include any of a variety of contours including, but not limited to, pulse width modulated PWM contours and varying voltage waveforms.

According to some embodiments, the term operational parameter within the present application defines a parameter of the circuit with the LED light source energized by an energizing waveform. According to some embodiments, electrical operational parameters which can have their magnitudes and relationships determined by the circuit include; illuminating voltages, illuminating resistance, illuminating power, etc. According to some embodiments, performance operational parameters include longevity, intensity, emitted color, etc.

According to some embodiments, the circuit monitors a first and a second electrical operational parameter. The circuit then determines if their relationship conforms to a target relationship programmed into the circuit. According to some embodiments, if there is a difference between the relationships, the circuit adjusts the energizing waveform (the illuminating voltage operational parameter) applied to the LED light source to effect a change in the current waveform to maintain the selected operational parameters at the target relationship.

According to some embodiments, a target relationship refers to a relationship that the circuit is configured to maintain. According to some embodiments, a target relationship is programmed into a memory of the circuit and comprises any of a number of relationships between at least two operational parameters of the circuit.

According to some embodiments, the circuit determines the magnitudes or values of electrical operational parameters while the circuit energizes the LED light source by measuring voltages at a variety of locations within the circuit and by employing current sensing resistors and other components to determine the magnitudes of additional operational parameters. In some embodiments, the present disclosure repeatedly determines electrical operational parameters at a high frequency and maintains selected operational parameters at a target relationship to manage performance parameters of the LED light source with high precision and high accuracy.

According to some embodiments, the target relationship includes an acceptable range for a single operational parameter and, when a circuit determination of that parameter indicates that the parameter is outside the range, the circuit adjusts the energizing waveform to bring the operational parameter within the acceptable range.

According to some embodiments, due to limitations regarding the precision of the circuit components, the operational relationship is not brought back to the exact value of the target relationship; however, the operational relationship is brought back to a value that is sufficiently close to the target relationship such that the difference between the two is minimal. Hence, the circuit effectively achieves the objective of maintaining the operational relationship at the target relationship According to some embodiments, if there is a difference between the operational relationship and the target relationship, the circuit changes the energizing waveform to effect a change in the current waveform to adjust the effective power to the LED light source. This adjustment in effective power input to the PN junction adjusts the temperature of the PN junction and consequently the operational parameters.

In some embodiments, the LED light source is energized with a power control system (constant voltage power supply, constant current power supply, etc.) and the circuit of the present application interferes with the functioning of the control system only when an operational relationship is not in conformance with the target relationship.

According to some embodiments, the circuit has a single or several predetermined target relationships with each determined by the desired performance parameters of the LED light source. In some embodiments, the target relationships apply to any two or more of operational parameters. In some embodiments, different target relationships apply to different operational parameters.

According to some embodiments, the circuit is additionally programmed with a target relationship having a range of acceptable values for an operational relationship. According to some embodiments, the target relationship is included for those instances where the target relationship cannot be maintained and/or for which the energizing voltage must be adjusted according to a different procedure. For example, if the ambient temperature drastically increased, preventing an adjustment in the energizing voltage adequate to maintain a first target relationship, the circuit would have a second target relationship to drastically reduce the energizing voltage to prevent damage to the LED.

According to some embodiments, the circuit comprises additional LEDs which do not have operational illuminating electrical parameters measured by the present circuit. In some embodiments, these additional LEDs are energized with a voltage waveform determined at least in part by the operational relationship of the operational parameters of the LED light source which are determined by the present circuit.

According to some embodiments, a first type of power is instantaneous illuminating power which is the instantaneous power being supplied to the LED at an instant in time when the LED is illuminating.

According to some embodiments, a second type of power is effective power which is the average power supplied to the LED light source over a typical period of time. In some embodiments, the average power supplied to the LED light source is determined by taking a plurality of instantaneous measurements at substantially equal increments of time throughout a time zone of a varying waveform or throughout a period of a pulsing waveform, with each measurement an instantaneous power. The plurality of instantaneous measurements are then averaged to determine the effective power. According to some embodiments, in addition to the measurements taken within the periods or time zones, the instantaneous power determinations are taken throughout a plurality of periods or time zones and then averaged to determine the effective power. Unlike the measurements taken to determine illuminating power, the measurements for the determination of effective power are taken without regard to the illuminating status of the LED light source. Effective power multiplied by a time span represents the total amount of electrical energy being supplied to the LED light source over the time span.

In some embodiments, energy is supplied to the LED light source in the form of an energizing waveform having a varying voltage. In some embodiments in which the LED light source is energized with a pulsing waveform with "ON & OFF" zones, some of the instantaneous determinations of effective power indicate that no instantaneous power is being supplied. Effective power is important because in some embodiments the circuit adjusts the energizing waveform to adjust the effective power being delivered to the LED light source as a means to maintain a target relationship between selected operational parameters.

FIG. 1 is a front view of a lighting device 20 according to some embodiments. Lighting device 20 includes LED 1 and circuit board 2 mounted in cylindrical base 3. Circuit board 2 includes circuit 10. Cylindrical base 3 includes power source PS.

Figure 2:
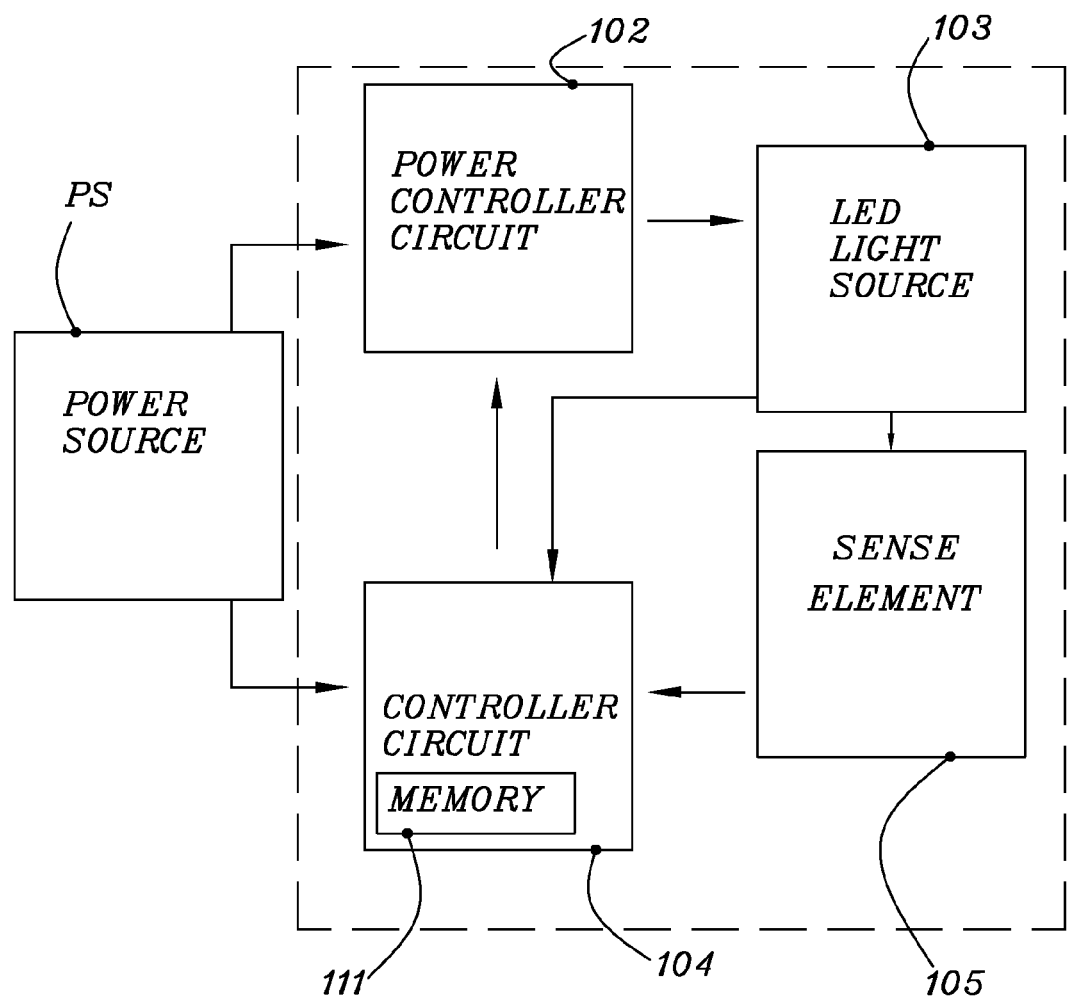
FIG. 2 is, according to some embodiments, a block diagram comprising circuit 10 of lighting device 20.

According to some embodiments FIG. 2 is a block diagram including circuit 10 of the present disclosure. According to some embodiments, circuit 10 comprises power controller circuit 102 comprising a DC/DC converter, LED light source 103 comprising at least one LED in series with a sense element 105 and controller circuit 104 comprising a microcontroller having a memory 111 storing a target relationship between at least two target operational parameters. According to some embodiments, controller circuit 104 is also programmed to energize LED light source 103 with a predetermined voltage waveform. According to some embodiments, circuit 10 connects power source PS to controller circuit 104 and to power controller circuit 102. Power controller circuit 102 energizes LED light source 103 with the predetermined voltage waveform effecting an initial current waveform. The predetermined voltage waveform is an operational illuminating parameter of the LED and the initial current waveform is an operational illuminating parameter of the LED.

According to some embodiments, LED light source 103 comprises a variable resistance having a magnitude dependent upon a number of parameters. According to some embodiments, the varying resistance of light source 103 causes other operational parameters such as the illuminating current to vary. According to some embodiments, controller circuit 104 rapidly and repeatedly determines the operational values of the target operational parameters. According to some embodiments, controller circuit 104 additionally rapidly and repeatedly determines the operational relationship between the target operational parameters and compares their determined relationship with the target relationship. According to some embodiments, if the determined relationship of the target operational parameters is different than the target relationship, controller circuit 104 effects a response based upon a magnitude of a difference between the determined relationship and the target relationship. According to some embodiments, the controller circuit 104 response comprises a signal to power controller circuit 102 to adjust the energizing waveform (illuminating voltage) to reduce the difference between the determined relationship and the targeted relationship. This process is continually repeated such that the determined relationship is maintained very close to the target relationship.

According to some embodiments, the target relationship is between the illuminating voltage and illuminating current of LED light source 103, and the target relationship is an equation having the illuminating voltage and illuminating current as variables. According to some embodiments, the target relationship is from a control equation having the illuminating voltage, illuminating current and LED junction temperature as variables.

In some embodiments, sense element 105 is a resistor of known value in series with LED light source 103 configured to enable a determination of current through LED light source 103. In some embodiments, sense element 105 is a combination of elements configured to enable determinations of one or more of current through LED light source 103 or voltage at the anode and/or cathode of LED light source 103.

According to some embodiments, the junction temperature is at a preselected constant value making it a constant and not a variable. By preselecting the junction temperature at a constant, the control equation is left with two remaining variables. If those two variables have magnitudes which satisfy the control equation, they are maintaining the target relationship and the junction temperature at the preselected constant value. According to some embodiments, maintaining the junction temperature at the predetermined constant value controls longevity of the lighting device. According to some embodiments, with a preselected junction temperature and a determined value of a first variable, only one value of the second variable satisfies the target relationship.

According to some embodiments, controller circuit 104 is programmed to signal power controller circuit 102 to energize LED light source 103 with an initial value of a first illuminating parameter, such as illuminating voltage, and determine the value of a second illuminating parameter, the resulting illuminating current. According to some embodiments, controller circuit 104 enters the initial value of the first illuminating parameter into the target equation to calculate the target value of the illuminating current. According to some embodiments, controller circuit 104 then compares the determined value of the illuminating current with the target value of the illuminating current. If they are not equal-if there is a difference-controller circuit 104 signals power control circuit 102 to adjust the value of the illuminating voltage such that the adjustment reduces or eliminates the difference between the target relationship and the operational relationship between the illuminating voltage and the illuminating current. If there is no difference, no adjustment in the initial value of illuminating voltage is made.

According to some embodiments, the initial value of a first operating parameter is an initial value of the illuminating current and illuminating voltage is determined by controller circuit 104. According to some embodiments, the first illuminating operational parameter is considered the control parameter and the second illuminating operational parameter considered the responding parameter. According to some embodiments, the initial value of a first operating parameter is an initial value of the illuminating voltage.

According to some embodiments, maintaining the relationship between the illuminating voltage and illuminating current has the effect of maintaining the junction temperature at a predetermined fixed value throughout a range of uncontrolled parameters, including ambient temperature, about LED light source 103.

According to some embodiments, the target relationship is a table based upon a predetermined constant value of junction temperature. The table comprises a range of values for the illuminating voltage and, for each value of the illuminating voltage, a related value of the illuminating current. According to some embodiments, the value for the illuminating voltage has a proportional relationship to the related value of the illuminating current throughout a range of values of the illuminating voltage. According to some embodiments, each value of the illuminating voltage has a related value of the illuminating current. According to some embodiments, there is no consistent proportional relationship between the illuminating voltage and illuminating current throughout the range of illuminating voltages.

According to some embodiments, the target relationship is from a control equation with a preselected constant value of junction temperature such that two operational parameters remain as variables.

According to some embodiments, a determination regarding an electrical operational parameter includes a determination of the magnitude or value of the operational parameter. According to some embodiments, the determination is made by a microcontroller of the circuit measuring or sensing voltages within the circuit and employing resistors of known values within the circuit to determine the value of the operational parameter. According to some embodiments, if the operational parameter is a constant (has a constant value), then a single determination would be an accurate representation of that value.

According to some embodiments, if the operational parameter is varying, then the determination is made by making a plurality of instantaneous determinations of the illuminating operational parameter and averaging those instantaneous determinations. An appropriate time span is established during which instantaneous determinations are averaged. The average value is then used as the determination of that operational parameter. If, according to some embodiments, the operational parameter waveforms within a circuit are represented by constants and the LED light source is continuously emitting light, then the instantaneous and average values of that operational parameter will be substantially equal.

According to some embodiments in which operational parameters have a pulsing or varying waveform, determinations are made only within each "ON" pulse or light illuminating zone of the waveform. In some embodiments, accuracy for a determination of a parameter is improved if multiple determinations are made, each within a separate "ON" pulse of a pulsing waveform or "ON" zone of a varying waveform, and an average of the plurality of instantaneous determinations is then used as the determination of the parameter. In some embodiments, accuracy is further improved if several instantaneous determinations of the parameter are taken within each "ON" pulse or "ON" zone and repeated for a plurality of "ON" pulses or "ON" zones, with all of the determinations averaged and used as the determination for that parameter. In some embodiments, single instantaneous determinations of the illuminating operational parameters are taken during the time the light emitting diode LED is emitting light—"ON" pulse or "ON" zone—and at a selected time within the "ON" pulse or "ON" zone such that the single instantaneous measurement is indicative of the value of the illuminating parameter during the pulse.

The waveform of the operational parameters can have a variety of contours. Therefore, in some embodiments, selecting the proper location within a waveform for determining the operational parameter with a single instantaneous determination is facilitated by viewing the waveform with an oscilloscope. In some embodiments, once the waveform is charted by an oscilloscope, basic mathematical integration techniques are used to identify the appropriate location for a single instantaneous determination measurement for determining an operational parameter. In some embodiments, a microcontroller is programmed to employ the appropriate location on the waveform to make the required determinations.

According to some embodiments, the present disclosure employs discrete operational amplifiers in controller circuit 104.

Figure 3:
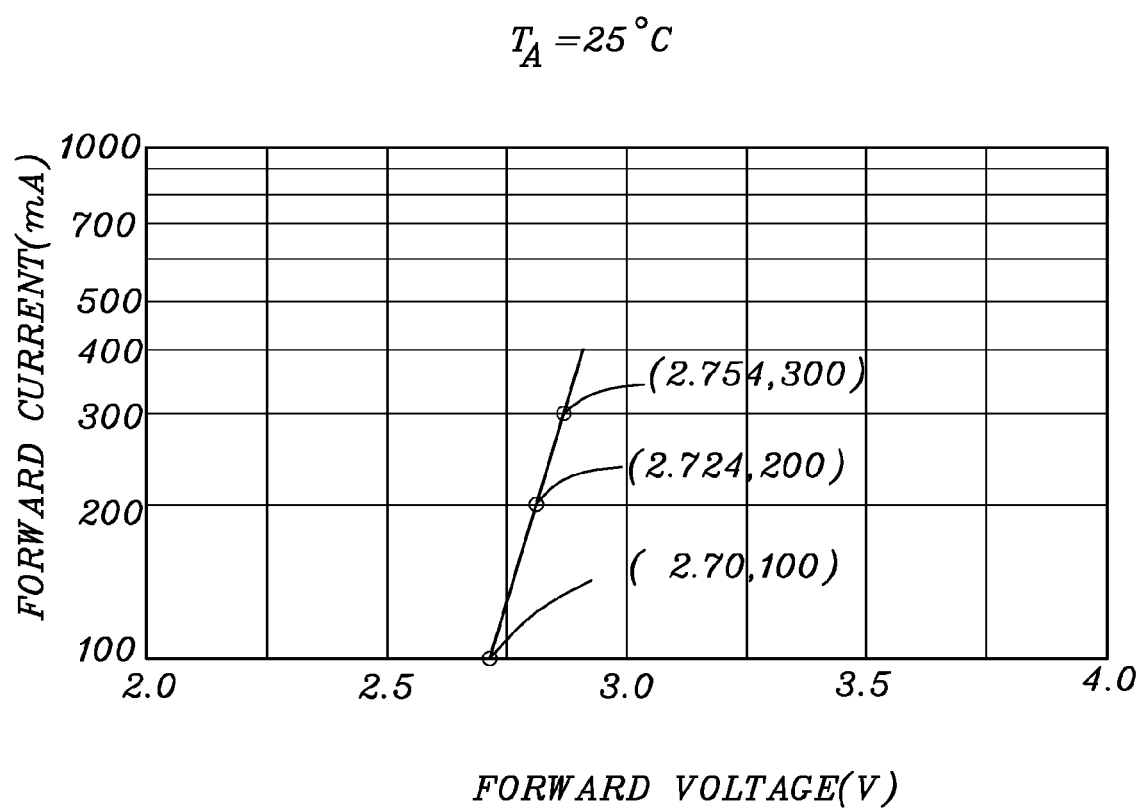
FIG. 3 is, according to some embodiments, a graph of forward current versus forward voltage for an LED of circuit 10.
Figure 4:
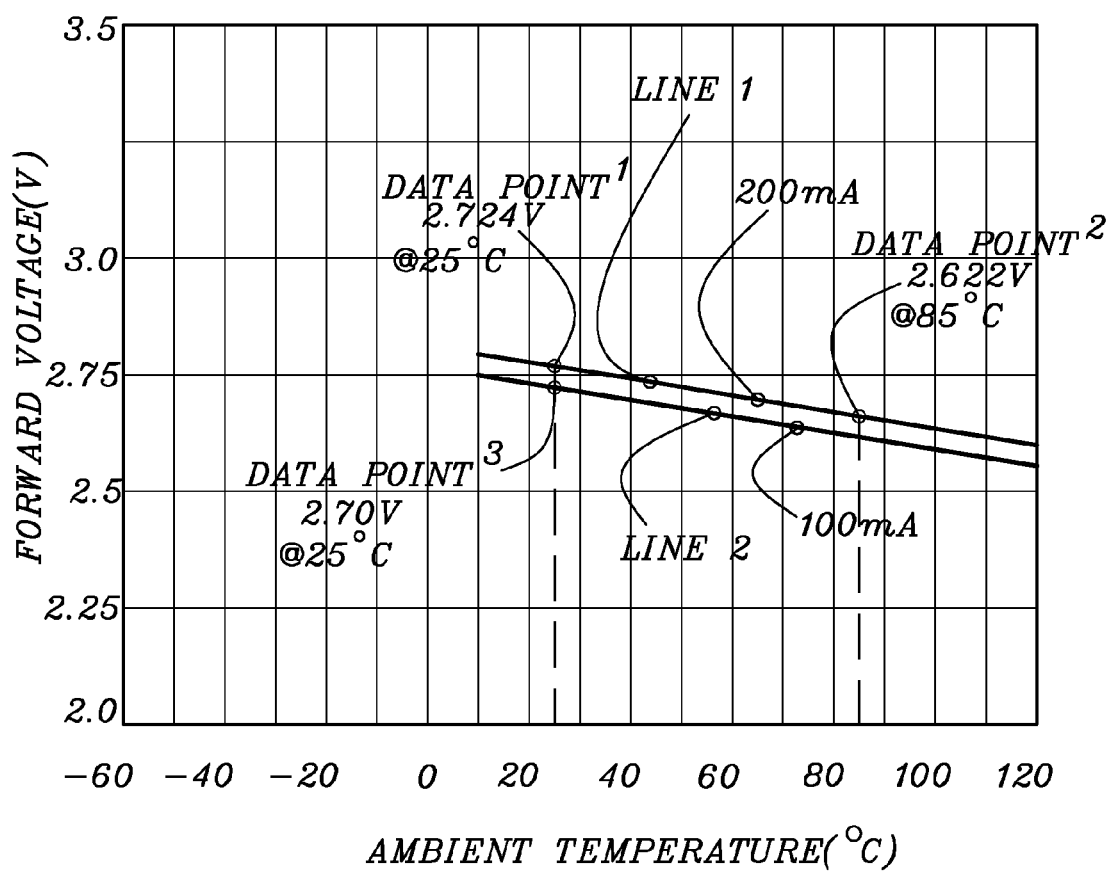
FIG. 4 is, according to some embodiments, a graph of forward voltage versus ambient temperature for an LED of circuit 10.

According to some embodiments, FIGS. 3 and 4 are included to disclose the concepts of the present disclosure and not meant to represent the relationship between illuminating voltage $V_f$, illuminating current $I_f$ and ambient temperature for every LED. LEDs can vary greatly between model numbers and between individual LEDs of the same model number. Therefore, according to some embodiments, the relationships depicted in the graphs of FIGS. 3 and 4 vary. According to some embodiments, the parameters of circuit 10 are modified to accommodate variations between LEDs such that circuit 10 controls the LEDs as required.

According to some embodiments, FIGS. 3 and 4 combine to disclose a typical relationship between illuminating voltage, illuminating current $I_f$ and ambient temperature for a NICHIA® NVSW119BT-V1 white LED. According to some embodiments, FIGS. 3 and 4 are generated by using short pulses of electricity to minimize the effect of electrical energy being added to the LED junction so that the results can be applied to LED circuits energized by a variety of waveforms. According to some embodiments, alternative versions of FIGS. 3 and 4 can be created using forward voltages and currents of different values than those employed in FIGS. 3 and 4, and a temperature bath of a different construction than employed in FIGS. 3 and 4. According to some embodiments, different methods used for creating alternative versions of FIGS. 3 and 4 are used to develop control equations.

FIG. 3 is a graph of illuminating forward current $I_f$ versus illuminating forward voltage $V_f$ for an LED at a constant ambient temperature of 25° C. FIG. 3 is a graph which, according to some embodiments, is typical of graphs supplied by LED manufacturers. FIG. 3 is substantially a straight line graph within a range of forward voltages; however, different LEDs have graphs having different contours such that some are partially straight and some are curved. The FIG. 3 graph is created by soaking the LED in a 25° C. bath, energizing it with a short pulse of known illuminating current I at specified intervals of illuminating current $I_f$ throughout a range of illuminating currents while recording the illuminating (forward) voltage $V_f$ measured at each value of illuminating current $I_f$. According to some embodiments, adequate time between measurements is provided to permit the LED junction temperature to return to the 25° C. bath temperature such that the junction temperature equals the ambient temperature. The data is used to create a graph such as FIG. 3, a table relating illuminating current $I_f$ to illuminating voltage $V_f$, or, according to some embodiments, an equation representing the relationship between illuminating current $I_f$ and illuminating voltage $V_f$ when the LED junction temperature is at 25° C.

The FIG. 3 graph is a substantially straight line and therefore can be represented by a linear equation. In some embodiments, FIG. 3 is represented by equation 1 which applies when the junction temperature is at 25° C. $V_f$ is the illuminating voltage and $I_f$ the illuminating current in milliamperes. This equation identifies the relationship between the illuminating voltage $V_f$ and illuminating current $I_f$ in milliamperes at 25° C.

$$V_f = 0.0003(I_f) + 2.664 \qquad \text{Equation 1}$$

According to some embodiments, FIG. 3 is not a straight line graph and the relationship is adequately represented by a more complex equation and/or by a table.

According to some embodiments, FIG. 4 line 1 is a graph of illuminating forward voltage $V_f$ versus ambient temperature typical of a graph for a NICHIA® NVSW119BT-V1 white LED at a constant illuminating current $I_f$ of 200 mA. FIG. 4, line 1 is a straight line graph which can be represented by a linear equation and, according to some embodiments, is a typical graph supplied by LED manufacturers. According to some embodiments, different LEDs have graphs having different characteristics.

The FIG. 4 line 1 graph is created by soaking the LED in a series of fixed ambient temperatures extending through a range of temperatures. According to some embodiments, at each temperature the LED is energized with a short pulse of electricity of a predetermined forward value of a constant current (in this case 200 mA) with the forward voltage $V_f$ recorded at each ambient temperature. According to some embodiments, adequate time between measurements is provided to permit the LED to re-stabilize at the bath temperature for the junction temperature equaling the ambient temperature. According to some embodiments, line 1 includes only 2 data points since that is all that is necessary to establish a straight line for the present discussion.

According to some embodiments, when the graph is not a straight line, the process is repeated at a plurality of ambient temperatures throughout a range of ambient temperatures, permitting the collected data to be used to create a table and/or an equation. FIG. 4 line 1 includes data between 10° C. and 120° C. The data can be used to create a graph such as FIG. 4 line 1, a table relating the illuminating voltage $V_f$ to the ambient temperature or, according to some embodiments, an equation representing the relationship between the illuminating forward voltage $V_f$ and the ambient temperature.

According to some embodiments, the two data points of FIG. 4 line 1 include data point 1 having an illuminating forward voltage of 2.724 V at 25° C. and data point 2 having an illuminating forward voltage $V_f$ of 2.622 V at 85° C. These data points over a change in temperature of 60° C. establish a slope of −0.0017 V/° C. According to some embodiments, this slope is known as the K factor. According to some embodiments, the illuminating voltage versus ambient temperature graph of a variety of LEDs results in a straight line graph within a specific range of ambient temperature. According to some embodiments, tables and/or nonlinear equations are used to achieve the objectives of the present application if the graph is not a straight line. FIG. 4 line 1 establishes the K factor or slope of the graph which, in some embodiments, is used to determine the change in forward illuminating voltage $\Delta V_f$ which would result from a change in junction temperature of $\Delta$ Tj. FIG. 4 line 1 can be represented by equation 2.

$$\Delta V_f = -0.0017 \Delta Tj. \quad \text{Equation 2}$$

According to some embodiments, equation 2 is calculated based on FIG. 4 line 1 in which the LED is energized at a constant forward illuminating current of 200 mA. FIG. 4 also shows line 2 which represents energizing the LED with a constant forward illuminating current of 100 mA. Line 2 has data point 3 at an illuminating voltage $V_f$ of 2.70 V at 25° C.

According to some embodiments, lines 1 and 2 are substantially parallel and representative of a large number of lines—not shown—each having a different data point at 25° C., each line having a different illuminating forward current $I_f$ and each having a related illuminating forward voltage $V_f$. According to some embodiments, lines 1 and 2 are parallel, having the same slope, and consequently the same K factor. Therefore, according to some embodiments, equation 2 employing a constant K factor value can be used to determine the change in illuminating voltage $\Delta V_f$ which would result from a change in junction temperature $\Delta$ Tj for any illuminating current within a range of illuminating currents, including the present examples of 100 mA and 200 mA illuminating currents.

According to some embodiments, some LEDs are represented by lines in FIG. 4 which are not perfectly parallel and which are not perfectly straight. However, according to some embodiments, for those LEDs, the illuminating voltage $V_f$ of the LED is measured at different currents and temperatures to create tables and/or equations which are used to create the information of FIG. 4 and an equation similar to equation 2.

According to some embodiments, it is known from FIG. 3 that data point 1 is at 25° C. and 200 mA, and the forward illuminating voltage $V_f$ is 2.724 volts. It is also known from FIG. 4 that at 200 mA equation 2 calculates the change in illuminating voltage $\Delta V_f$ that would result from an increase in junction temperature from the 25° C. of data point 1 to the 85° C. of data point 2 representing a change in junction temperature $\Delta$ Tj of 60° C.

$$(\Delta Tj \text{ of } 60° \text{ C.}):\Delta V_f = -0.0017\Delta Tj = -0.102 \text{ volts} \quad \text{Equation 2}$$

Equation 2 determines the expected change in forward voltage $\Delta V_f$ for a 60° C. increase in ambient temperature. Hence, by moving from data point 1 to data point 2, the illuminating voltage $V_f$ changes by −0.102 volts. Decreasing the data point 1 illuminating voltage $V_f$ of 2.724 by 0.102 V results in a calculated illuminating forward voltage 2.622 $V_f$ at the 85° C. temperature of data point 2.

According to some embodiments, an alternative way of calculating the illuminating voltage $V_f$ for an LED light source employs an equation including a K factor. According to some embodiments, the illuminating voltage $V_f$ is calculated for an LED energized by a illuminating current $I_f$ of 200 mA having a junction temperature different than 25° C. by using data point 1 of FIG. 4 comprising 2.724 V at 25° C. ambient temperature in equation 1. According to some embodiments equation 1 becomes:

$$V_f = 2.724 - K(Ta - 25° \text{ C.}) \quad \text{Equation 3}$$

Here Ta is both the ambient and junction temperature because the ambient and junction temperatures are considered equal in creating FIG. 4. Since the LED represented by FIGS. 3 and 4 is soaked at an ambient temperature, the entire LED, including its junction, stabilizes at that ambient temperature.

According to some embodiments, there is no or insignificant electrical energy added to the junction when constructing FIG. 4, so the ambient temperature is the junction temperature. According to some embodiments, the pulse of electricity is short enough to avoid adding electrical energy to the junction of a magnitude which would significantly or unacceptably increase the junction temperature beyond the ambient temperature. Hence, according to some embodiments, the illuminating voltage $V_f$ recorded at each data point of FIG. 4 line 1 represents the illuminating voltage $V_f$ with the LED junction temperature equal to the ambient temperature for that data point. According to some embodiments, the data points on FIG. 4 are determined using a reduced forward current to reduce the electrical energy being added to the junction to further assure the equivalents of the ambient temperature and the junction temperature.

According to some embodiments, for the above-mentioned reasons junction temperature Tj is substituted for ambient temperature $T_a$ in equation 3 to arrive at equation 4.

$$V_f = 2.724 - K(Tj - 25° \text{ C.}) \quad \text{Equation 4}$$

where Tj is the junction temperature and K=0.0017 V/° C. Equation 4 identifies the relationship between the illuminating voltage and the junction temperature when the illuminating current $I_f$ is constant at 200 mA.

According to some embodiments, in order to remove the 200 mA limitation regarding equation 4, equations 1 and 4 are combined to form equation 5, which identifies the relationship between the illuminating voltage $V_f$ and the junction temperature Tj for any illuminating current within a range of illuminating currents. According to some embodiments, equation 5 is employable for a range of illuminating currents and is not limited to the 200 mA illuminating current.

According to some embodiments, the illuminating voltage $V_f$ of equation 1 ($V_f$=0.0003 ($I_f$)+2.664) which represents the illuminating voltage $V_f$ for any current at 25° C.) is substituted for the illuminating voltage $V_f$ (2.724) of data point 1 in equation 4 (which represents a 200 mA illuminating current $I_f$ at 25° C.) to create equation 5. Equation 5 is valid for all illuminating currents and all junction temperatures within their appropriate ranges. According to some embodiments, equation 5 is a control equation. Preselecting junction temperature Tj as a constant in equation 5, according to some embodiments, creates a target equation (target operational relationship).

$$\text{Illuminating Voltage} = V_f = 0.0003(I_f) + 2.707 - 0.0017Tj \qquad \text{Equation 5}$$

In equation 5 forward illuminating voltage $V_f$ is in volts, forward current $I_f$ is in milliamperes and junction temperature Tj is in degrees Celsius.

According to some embodiments, equation 5 includes three variables and, if one variable is selected as a constant, equation 5 provides a relationship between the remaining two variables. According to some embodiments, the junction temperature is selected as a constant and the remaining variables are illuminating voltage $V_f$ and illuminating current $I_f$. According to some embodiments, for a selected LED junction temperature, equation 5 becomes a target relationship (target equation) which is programmed into the circuit.

According to some embodiments, the junction temperature Tj is selected to be at a constant value to assure a reliable and consistent performance parameter of the LED such as longevity or color consistency. According to some embodiments, a desired junction temperature for the energized LED is specified and the LED is energized with an estimated first or initial value of illuminating constant current. According to some embodiments, the circuit comprises a memory storing a target relationship between the illuminating current (a first target operational parameter) and the illuminating voltage (a second target operational parameter). The circuit is programmed to determine the illuminating voltage associated with the first value of illuminating current and compare its determined value with its calculated value. The calculated value of illuminating voltage is calculated by employing the first value of illuminating current in equation 5. According to some embodiments, if the determined value of illuminating voltage equals the calculated value of illuminating voltage, the operating relationship between the two is equal to the target relationship defined by equation 5. In that case, the junction temperature is at its selected value and the longevity and/or color of the LED is controlled.

According to some embodiments, if there is a difference between the two voltages and specifically the determined illuminating voltage is less than the voltage calculated from equation 5, the circuit is programmed to reduce the magnitude of value of the constant current by a step of a programmed value to effect a second value of illuminating current. This reduction in current magnitude reduces the electrical energy the LED is receiving, thereby reducing the junction temperature and the illuminating voltage. The circuit is programmed to determine the illuminating voltage associated with the second value of illuminating current and compare it with a new calculated illuminating voltage from equation 5, now using the second value of illuminating current. According to some embodiments, if the determined illuminating voltage is again less than the voltage calculated using equation 5, the circuit is programmed to reduce the constant current by a step of a programmed value to effect a third value of illuminating current. The process keeps repeating until the values of the determined illuminating voltage and determined illuminating current comply with the calculated values from equation 5. The magnitude of the adjustment/steps of the constant current and the frequency of adjustment depend upon the performance requirements of the LED and components of the circuit.

The previous example discloses a target relationship and an operating relationship between the illuminating voltage and illuminating current with the junction temperature at a selected constant value. According to some embodiments, the target relationship and operating relationship can define a relationship between electrical operating parameters such as illuminating resistance and illuminating current. According to some embodiments, the target relationship and operating relationship can define the relationship between any electrical operating parameters from the group including; illuminating current, illuminating resistance, illuminating power, illuminating voltage, etc.

Equation 5 can be manipulated to establish additional equations for defining target relationships between alternate operating parameters including illuminating current $I_f$, illuminating electrical power, illuminating resistance, etc. which can be used as target relationships in the circuit.

According to some embodiments, 6,7,8 and 8A are additional control equations which are developed from equation 5 and which are employed in various embodiments as target relationships or target equations.

$$\text{Illuminating Current} = I_f = (V_f - 2.707 + 0.0017Tj)/.0003 \qquad \text{Equation 6}$$

$$\text{Illuminating Power} = (I_f)(V_f) = 0.0003(I_f^2) + 2.707(I_f) - 0.0017Tj \qquad \text{Equation 7}$$

Equation 8: Illuminating Resistance as a function of illuminating voltage.

$$Rj = V_f - 2.707 + 0.0017 + ((2.707 - 0.0017\ Tj(0.003))/(V_f - 2.707 + 0017Tj) \qquad \text{Equation 8}$$

Equation 8A: Illuminating Resistance as a function of illuminating current.

$$Rj = 0.0003 + 2.707/I_f - (0.0017Tj/I_f) \qquad \text{Equation 8A}$$

For example, equation 8A is, according to some embodiments, a control equation having illuminating resistance Rj, illuminating current $I_f$ and junction temperature as variables. Preselecting junction temperature Tj as a constant leaves illuminating resistance Rj and illuminating current as variables in a target equation or target relationship. According to some embodiments, the control circuit adjusts the illuminating current until a particular determined value of illuminating current has a corresponding determined value of illuminating resistance which satisfies equation 9. When this relationship is achieved, the junction temperature is at its preselected value.

According to some embodiments, equations 3-8A employ three basic operating parameters including illuminating voltage $V_f$, illuminating current $I_f$ and junction temperature Tj to control operating performance parameters of the illuminating LED including, but not limited to color and/or longevity. According to some embodiments, one parameter is selected and made a constant, to employ an equation to define the relationship between the remaining two parameters. For example, using equation 5, the junction temperature Tj at 100° C. is selected and, by substituting that junction temperature into equation 5, equation 9 is created. According to some embodiments, equation 9 is employed as a target relationship between illuminating voltage $V_f$ and illuminating current $I_f$.

$$V_f=0.0003(I_f)+2.707-0.0017Tj \qquad \text{Equation 5}$$

$$V_f=0.0003(I_f)+2.707-0.0017(100)@100°\ C. \qquad \text{Equation 9}$$

$$V_f=0.0003(I_f)+2.537\ @100°\ C. \qquad \text{Equation 9}$$

Equation 9 comprises three parameters including illuminating voltage $V_f$, illuminating current $I_f$ and junction temperature Tj. Selecting the junction temperature at 100° C. leaves only the illuminating voltage $V_f$ and illuminating current $I_f$ as parameters. According to some embodiments, according to equation 9, if the LED is energized with a constant illuminating current $I_f$ of a magnitude which effects a determined (measured) illuminating voltage $V_f$ equal to the illuminating voltage $V_f$, calculated using equation 9 then the junction temperature is 100° C. According to some embodiments, it would be difficult to know what value of constant illuminating current, would satisfy equation 9. However, according to some embodiments, this problem is overcome by programming the circuit to energize the LED with a first magnitude of constant illuminating current based upon the expected final magnitude of constant illuminating current of the lighting device.

According to some embodiments, the illuminating current $I_f$ as the control operating parameter is set at 200 mA and entered into equation 9, giving a required responding illuminating voltage operating parameter of Vf at 2.597. For this scenario, the circuit would not change the controlling current and the junction temperature would be as required at 100° C. However, there is no way of knowing in advance that energizing the LED with 200 mA would result in a measured illuminating voltage $V_f$ of 2.597. Therefore, if the illuminating current is set $I_f$ at 225 mA, the LED receives too much power and the measured illuminating voltage $V_f$ would be less than 2.597. In this case, the circuit would compare the measured/determined illuminating voltage $V_f$ with the target illuminating voltage $V_f$ and decide that it was too low, indicating the junction temperature was too high.

According to some embodiments, the circuit responds by reducing the illuminating current $I_f$ by an amount such as 5 mA making the illuminating current $I_f$ 220 mA (0.22A). The circuit then uses equation 9 to recalculate the calculated illuminating voltage $V_f$ using 0.220A. Once again the circuit measures the illuminating voltage $V_f$, compares it to the calculated illuminating voltage and, if it is too low, steps the current down a second time. The process is repeated until the measured determined value/magnitude of the illuminating voltage $V_f$ equals the value of the illuminating voltage $V_f$ calculated by equation 9. According to some embodiments, the above example employs the illuminating current as the control operating parameter and the illuminating voltage as the responding operating parameter.

Equations 3-8 are based on an LED having graphs according to FIGS. 3 and 4. According to some embodiments, equations 3-8A are adjusted to accommodate other LEDs while still employing the concepts of the present disclosure.

Although the forward voltage and forward current used in the previously disclosed detailed description of the present have stepped values, the values are constant while the LED is energized. According to some embodiments, LEDs energized with pulse width modulated voltages or varying voltages have their operating parameters controlled with target equations from the present disclosure.

The adjustments in the energizing voltage applied to the LED to bring the operating relationship towards the target relationship used in the previously disclosed detailed description of the present disclosure employed stepping the values of the illuminating current. According to some embodiments, the circuit is programmed to adjust other operating parameters such as illuminating voltage to bring the operating relationship towards the target relationship.

Figure 5:
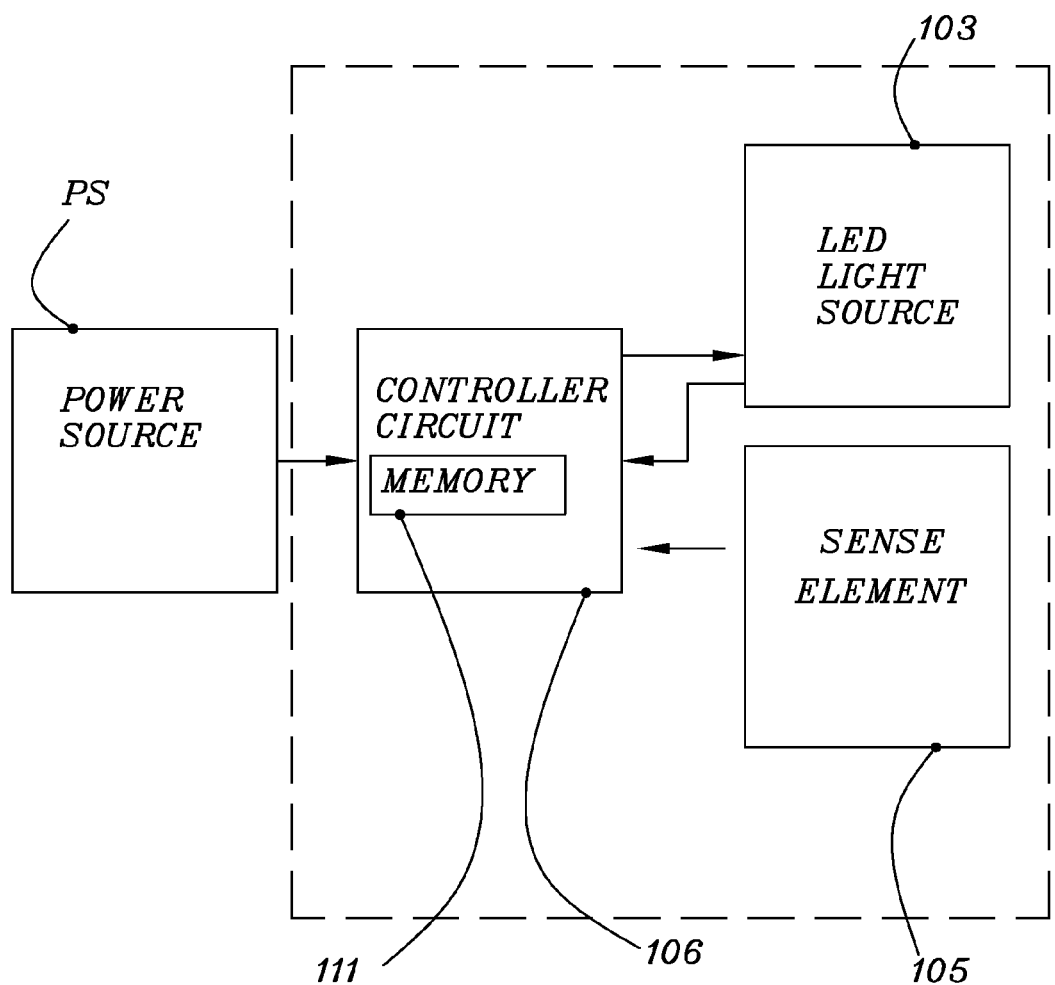
FIG. 5 is, according to some embodiments, a block diagram comprising circuit 12.

FIG. 5 is a block diagram of circuit 12 which, according to some embodiments, replaces circuit 10 of FIG. 2. Circuit 12 comprises power source PS energizing LED light source 103. Controller circuit 106 is, according to some embodiments, a microcontroller which functions similarly to circuit 10 in that it has memory 111 storing a target relationship between at least two operational parameters. According to some embodiments, controller circuit 106 determines illuminating operating parameters, compares their operational relationship with the target relationship, and controls a field effect transistor to apply pulse width modulation PWM to LED light source 103. Circuit 12 differs from circuit 10 in that it does not include power controller 102. According to some embodiments, controller circuit 106 uses pulse width modulation PWM to intercept and alter the energizing waveform from power source PS which is applied to LED light source 103. The PWM signal is adjusted whenever there is a difference between the operational relationship in the target relationship, and the adjustment brings the operational relationship towards the target relationship.

FIG. 6 illustrates a flow-chart of a method 100 of bringing an operational relationship between a first illuminating operational parameter and a second illuminating operational parameter towards a target relationship. Method 100 includes process 101, programing a circuit having a memory storing a target relationship between a first illuminating operational parameter and a second illuminating operational parameter. At process 102, an LED light source is energized with a voltage waveform by the circuit and the first operational parameter, the second operational parameter, the operational relationship between the first operational parameter and the second operational parameter and a determination of a nonconformance between the operational relationship and the target relationship are determined. At process 103, a change in the voltage waveform in response to the nonconformance for bringing the operational relationship towards conformance with the target relationship is effected. According to some embodiments, any of equations 6, 7, 8, 8A, etc. with the junction temperature preselected at a predetermined value as previously presented in the present disclosure is employed as the target relationship. According to some embodiments, any of equations 6, 7, 8, 8A, etc. with any one of their operational parameters preselected at a predetermined value is employed as the target relationship for controlling the preselected operational parameter.

FIG. 7 illustrates a flow-chart of a method 200 of maintaining an operational relationship between an illuminating voltage and an illuminating current in conformance with a target relationship. Method 200 includes, according to some embodiments, process 201, programming a circuit having a memory storing a target relationship between an illuminating voltage and an illuminating current. At process 202, according to some embodiments, an LED light source is energized with a voltage waveform for the LED light source having a current waveform. At process 203, according to some embodiments, an operational relationship between the illuminating voltage and the illuminating current is maintained in conformance with the target relationship for maintaining the junction temperature of the LED light source at a predetermined value. According to some embodiments, equation 5, with the junction temperature preselected at the predetermined value as previously presented in the present disclosure, is employed as the target relationship.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed:

1. A lighting device comprising:
an electrical circuit comprising a light-emitting diode (LED) light source, said LED light source comprising at least one LED, said electrical circuit connected to a power source configured to energize the LED light source with an energizing waveform effecting a plurality of operational parameters, said electrical circuit comprising a memory storing a target relationship between a first electrical operational parameter and a second electrical operational parameter, said electrical circuit configured to effect a determination of an operational relationship between the first electrical operational parameter and the second electrical operational parameter, and
said electrical circuit configured to determine a difference between said operational relationship and said target relationship and to effect a change in said energizing waveform in response to the difference, said change bringing the operational relationship towards said target relationship.

2. A lighting device according to claim 1 wherein;
the first electrical operational parameter comprises an illuminating voltage or a function of the illuminating voltage, and
the second electrical operational parameter comprises an illuminating current or a function of the illuminating current.

3. A lighting device according to claim 1 wherein;
the first electrical operational parameter comprises a function of an illuminating voltage, the second electrical operational parameter comprises a function of an illuminating current, and
the target relationship requires a magnitude of the function of the illuminating current to have the target relationship with a magnitude of the function of the illuminating voltage.

4. A lighting device according to claim 1 wherein;
the first electrical operational parameter comprises an illuminating resistance, and
the second electrical operational parameter comprises an illuminating current.

5. A lighting device according to claim 1 wherein;
the target relationship requires the first electrical operational parameter to have a magnitude related to a magnitude of the second electrical operational parameter.

6. A lighting device according to claim 1 wherein;
the target relationship is derived at least in part from a plurality of measurements of a forward voltage of the LED light source versus a forward current of the LED light source over a range of forward voltages.

7. A lighting device according to claim 1 wherein;
the target relationship is derived at least in part from a plurality of measurements of a forward voltage of the LED light source versus an ambient temperature over a range of ambient temperatures.

8. A lighting device according to claim 1 wherein;
the target relationship is an equation having at least two variables.

9. A lighting device according to claim 1 wherein;
the target relationship is a table, and
said table comprises a first group of numbers related to a magnitude of an illuminating voltage of said LED light source and a second group of numbers related to a magnitude of an illuminating current of said LED light source.

10. A lighting device according to claim 1 wherein;
the energizing waveform is a constant voltage about the LED light source effecting a constant current about the LED light source, and
the change adjusts an illuminating voltage operational parameter to effect an adjustment in an illuminating current operational parameter.

11. A lighting device according to claim 1 wherein;
the electrical circuit comprises a microcontroller comprising the memory storing the target relationship and the microcontroller is configured to effect the determination of the operational relationship.

12. A lighting device according to claim 1 wherein;
the energizing waveform is a pulse width modified (PWM) waveform.

13. A lighting device according to claim 1 wherein;
the energizing waveform is a varying voltage waveform.

14. A lighting device comprising:
an electrical circuit comprising a light-emitting diode (LED) light source, said LED light source comprising at least one LED, said electrical circuit connected to a power source configured to energize the light source with an energizing waveform effecting a plurality of operational parameters, said electrical circuit comprising a microcontroller comprising a memory storing a target relationship between an illuminating voltage of the light source and an illuminating current of the light source, said electrical circuit configured to effect a determination of an operational relationship between the illuminating voltage and the illuminating current, and
said electrical circuit configured to determine a difference between said operational relationship and said target relationship and to effect a change in said energizing waveform in response to the difference, said change bringing the operational relationship towards said target relationship.

15. A lighting device according to claim 14 wherein;
the target relationship requires the illuminating voltage to have a magnitude determined by the magnitude of the illuminating current.

16. A lighting device according to claim 14 wherein;
the target relationship is derived at least in part from a plurality of measurements of a forward voltage of the light source versus a forward current of the light source over a range of forward voltages.

17. A lighting device according to claim 14 wherein;
the target relationship is derived at least in part from a plurality of measurements of a forward voltage of the LED light source versus an ambient temperature over a range of ambient temperatures.

18. A lighting device according to claim 14 wherein;
the target relationship is an equation having at least two variables.

19. A lighting device according to claim 14 wherein;
the target relationship is a table, and
said table comprises a first group of numbers with each number related to a magnitude of the illuminating voltage and to a magnitude of the illuminating current.

20. A lighting device according to claim 14 wherein;
the energizing waveform is a constant voltage about the light source effecting a constant current about the light source, and
the change adjusts the illuminating voltage to effect an adjustment in the illuminating current operational parameter.

21. A method for controlling a lighting device comprising:
energizing, by a circuit, a light-emitting diode (LED) light source from a source of power with a voltage waveform, said circuit comprising a memory storing a target relationship between a first illuminating operational parameter and a second illuminating operational parameter of the LED light source;
effecting, by said circuit, a determination of the first operational parameter, a determination of the second operational parameter, a determination of an operational relationship between the first operational parameter and the second operational parameter, and a determination of a nonconformance between the operational relationship and said target relationship; and
effecting, by said circuit, a change in the voltage waveform in response to the nonconformance, said change bringing the operational relationship towards conformance with said target relationship.

22. A method for controlling a lighting device comprising:
energizing, by a circuit a light-emitting diode (LED) light source from a source of power with a voltage waveform for the LED light source having a current waveform, said circuit comprising a memory storing a target relationship between an illuminating voltage and an illuminating current;
maintaining, by said circuit, an operational relationship between the illuminating voltage and the illuminating current in conformance with the target relationship for maintaining a junction temperature of the LED light source at a predetermined value.

* * * * *